(12) United States Patent  
Lu et al.

(10) Patent No.: US 11,514,013 B2
(45) Date of Patent: Nov. 29, 2022

(54) DATA GOVERNANCE WITH CUSTOM ATTRIBUTE BASED ASSET ASSOCIATION

(71) Applicant: INTERNATIONAL BUSINESS MACHINES CORPORATION, Armonk, NY (US)

(72) Inventors: Liang Lu, Beijing (CN); Sun Chun Hua, Beijing (CN); Jian Ling Shi, Baoji (CN); Yi Yang Ren, Beijing (CN); Chun Leng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/736,977

(22) Filed: Jan. 8, 2020

(65) Prior Publication Data

US 2021/0209083 A1 Jul. 8, 2021

(51) Int. Cl.
*G06F 7/00* (2006.01)
*G06F 16/22* (2019.01)
*G06F 16/2457* (2019.01)
*G06F 16/2458* (2019.01)
*G06F 16/28* (2019.01)
*G06F 16/242* (2019.01)

(52) U.S. Cl.
CPC ........ *G06F 16/2237* (2019.01); *G06F 16/243* (2019.01); *G06F 16/2458* (2019.01); *G06F 16/24573* (2019.01); *G06F 16/284* (2019.01)

(58) Field of Classification Search
CPC .. G06F 16/285; G06F 16/2237; G06F 16/243; G06F 16/24573; G06F 16/2458; G06F 16/284; G06N 5/046; G06N 5/003
USPC ........................................ 707/737, 741, 748
See application file for complete search history.

(56) References Cited

U.S. PATENT DOCUMENTS

| | | | |
|---|---|---|---|
| 9,330,168 B1 * | 5/2016 | Brown | G06Q 30/0278 |
| 10,198,507 B2 | 2/2019 | Pawar et al. | |
| 2015/0186507 A1 | 7/2015 | Pawar et al. | |
| 2015/0254714 A1 * | 9/2015 | Zhuang | G06F 16/951 |
| | | | 705/14.54 |
| 2019/0155941 A1 | 5/2019 | Bhide et al. | |
| 2020/0402098 A1 * | 12/2020 | Bent, III | G06F 40/284 |

OTHER PUBLICATIONS

Annoymous, "Automatic term assignment", IBM InfoSphere Information Server content hub, downloaded Jan. 3, 2020, 2 pages.

(Continued)

*Primary Examiner* — Md I Uddin
(74) *Attorney, Agent, or Firm* — Robert Shatto; Andrew D. Wright; Roberts Calderon Safran & Cole, P.C.

(57) ABSTRACT

A computer-implemented method includes: reading a vector of a first table in a database, the vector including counts of a plurality of keywords in the first table, the plurality of keywords including a first keyword and a second keyword; determining a first custom attribute describing the first table, the first custom attribute having a vector including counts of at least a first portion of the plurality of keywords in the first table; determining a multiplier of the first custom attribute, the multiplier being a number of other tables that reference the first custom attribute; and revising the vector of the first table based on the first custom attribute.

19 Claims, 10 Drawing Sheets

(56) References Cited

OTHER PUBLICATIONS

Bronshtein, "A Quick Introduction to K-Nearest Neighbors Algorithm", Noteworth—The Journal Blog, Apr. 11, 2017, 6 pages.
Annoymous, "K Nearest Neighbors—Classification", saedsayad.com, downloaded Jan. 3, 2020, 3 pages.
Harrison, "Machine Learning Basics with the K-Nearest Neighbors Algorithm", towardsdatascience.com, Sep. 10, 2018, 15 pages.
Mell et al., "The NIST Definition of Cloud Computing", NIST, Special Publication 800-145, Sep. 2011, 7 pages.

\* cited by examiner

|         | Table 1 | Table 2 | Table 3 | Table 4 | Table 5 |
|---------|---------|---------|---------|---------|---------|
| Table 1 | 0       | 3       | 6       | 2       | 9       |
| Table 2 | 3       | 0       | 5       | 8       | 1       |
| Table 3 | 6       | 5       | 0       | 7       | 2       |
| Table 4 | 2       | 8       | 7       | 0       | 8       |
| Table 5 | 9       | 1       | 2       | 8       | 0       |

| Table | Term | Predicted |
|---|---|---|
| Table 3 | Term 2 | Y |
| Table 4 | Term 2 | Y |
| Table 2 | Term 1 | N |

| Table | Term | Predicted |
|-------|------|-----------|
| Table 7 | Term 2 | Y |
| Table 9 | Term 2 | Y |
| Table 3 | Term 9 | Y |
| Table 4 | Term 9 | Y |
| Table 2 | Term 1 | N |

DATA GOVERNANCE WITH CUSTOM ATTRIBUTE BASED ASSET ASSOCIATION

BACKGROUND

Aspects of the present invention relate generally to data governance and, more particularly, to improving accuracy in asset association in data governance.

In data governance, users associate business metadata (or other data) such as, for example, terms, with technical metadata (or other data) such as, for example, a table in a database. For example, users associate a term with the name "user name" with other database tables that contain additional data that should be (but is not already) associated with data that is already associated with that term ("user name").

SUMMARY

In a first aspect of the invention, there is a computer-implemented method including: reading, by a computer device, a vector of a first table in a database, the vector including counts of a plurality of keywords in the first table, the plurality of keywords including a first keyword and a second keyword; determining, by the computer device, a first custom attribute describing the first table, the first custom attribute having a vector including counts of at least a first portion of the plurality of keywords in the first table; determining, by the computer device, a multiplier of the first custom attribute, the multiplier being a number of other tables that reference the first custom attribute; and revising, by the computer device, the vector of the first table by determining a first product by multiplying a count of the first keyword in the vector of the first custom attribute by the multiplier of the first custom attribute, determining a second product by multiplying a count of the second keyword in the vector of the first custom attribute by the multiplier of the first custom attribute, establishing a revised count of the first keyword in the vector of the first table by adding the first product to the count of the first keyword in the vector of the first table, and establishing a revised count of the second keyword in the vector of the first table by adding the second product to the count of the second keyword in the vector of the first table.

In another aspect of the invention, there is a computer program product including one or more computer readable storage media having program instructions embodied therewith. The program instructions are executable to: read a vector of a first table in a database, the vector including counts of a plurality of keywords in the first table, the plurality of keywords including a first keyword and a second keyword; determine a first custom attribute describing the first table, the first custom attribute having a vector including counts of at least a first portion of the plurality of keywords in the first table; determine a multiplier of the first custom attribute, the multiplier being a number of other tables that reference the first custom attribute; and revise the vector of the first table by determining a first product by multiplying a count of the first keyword in the vector of the first custom attribute by the multiplier of the first custom attribute, determining a second product by multiplying a count of the second keyword in the vector of the first custom attribute by the multiplier of the first custom attribute, establishing a revised count of the first keyword in the vector of the first table by adding the first product to the count of the first keyword in the vector of the first table, and establishing a revised count of the second keyword in the vector of the first table by adding the second product to the count of the second keyword in the vector of the first table.

In another aspect of the invention, there is system including a processor, a computer readable memory, and one or more computer readable storage media. The system includes: program instructions to read a vector of a first table in a database, the vector including counts of a plurality of keywords in the first table, the plurality of keywords including a first keyword and a second keyword; program instructions to determine a first custom attribute describing the first table, the first custom attribute having a vector including counts of at least a first portion of the plurality of keywords in the first table; program instructions to determine a multiplier of the first custom attribute, the multiplier being a number of other tables that reference the first custom attribute; and program instructions to revise the vector of the first table by determining a first product by multiplying a count of the first keyword in the vector of the first custom attribute by the multiplier of the first custom attribute, determining a second product by multiplying a count of the second keyword in the vector of the first custom attribute by the multiplier of the first custom attribute, establishing a revised count of the first keyword in the vector of the first table by adding the first product to the count of the first keyword in the vector of the first table, and establishing a revised count of the second keyword in the vector of the first table by adding the second product to the count of the second keyword in the vector of the first table. The program instructions are stored on the one or more computer readable storage media for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
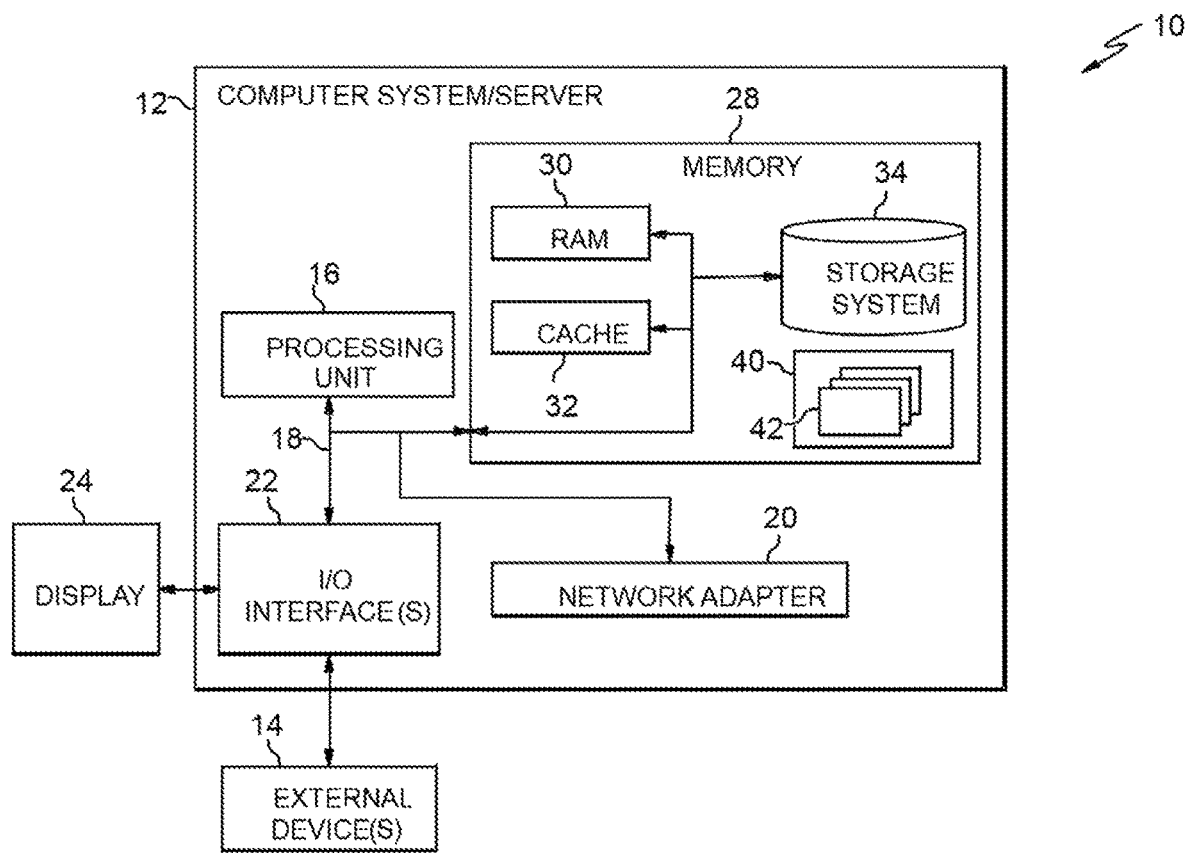
FIG. 1 depicts a cloud computing node according to an embodiment of the present invention.

Aspects of the present invention relate generally to data governance and, more particularly, to improving accuracy in asset association in data governance. According to aspects of the invention, location vectors of a plurality of tables in a database are revised. The location vectors are used to determine similarities between the tables (by determining the distance between the tables). In embodiments, a location vector of a table is revised by adding reference counts of keywords in custom attributes to the counts of those keywords in the location vector of the table. In this manner, implementations of the invention increase the accuracy of associating tables in the database with a subject table so that terms assigned to the associated tables are properly assigned to the subject table.

Accuracy in the association of the business metadata (or any business data) with the proper technical metadata (or any technical data) is important. For example, a business that has the desire to match a particular customer with additional data (a table in a database, for example) wants a high level of accuracy in associating the particular customer with the additional data.

Technical metadata assets in the data governance domain are often correlated to business assets. Using a machine learning (ML) K-Nearest Neighbor (KNN) algorithm to calculate the degree of correlation between the assets can lead to inaccuracies in the correlation if the distances (based on vectors, for example) between the assets are not accurate. For example, one metadata Asset Table A named "Survey" is an interpretation of a survey, another metadata Asset Table B named "Feedback" is an explanation of feedback related to the survey. In this example, because the names of the tables are different, the ML KNN algorithm cannot accurately calculate the correlation between the two. However, these two tables may have a strong correlation. In this example, Asset Table A and Asset Table B both have "Name" and "Description" attributes, as well as one or more custom attributes. However, ML KNN may inaccurately predict the correlation between the two tables because, although ML KNN recognizes the "Name" and "Description" attributes, it does not correlate "Survey" to "Feedback". Embodiments of the invention improve the accuracy of correlation predictions by revising the distances between the assets (tables) using custom attributes that exist in both assets and weighting each custom attribute according to how many other assets reference the custom attribute.

Embodiments of the invention calculate a custom attribute (CA) reference count that is the number of other assets in the system that reference the CA, and revise a vector of a first asset based on the CA reference count. A keyword in the CA that does not exist in the list of keywords of the first asset is added to the list of keywords of the first asset, and the count of that keyword in the vector of the first asset is equal to the reference count of that keyword. The reference count of a keyword in the CA that exists in the list of keywords of the first asset is added to the count of that keyword in the vector of the first asset. In this way, embodiments of the invention revise the keyword frequency of term frequency-inverse document frequency (TF-IDF) using the reference counts of one or more custom attributes.

In information retrieval, TF-IDF is a numerical statistic that is intended to reflect how important a word is to a document in a collection or corpus. TF-IDF is used as a weighting factor in searches of information retrieval, text mining, and user modeling. The TF-IDF value increases proportionally to the number of times a word appears in the document and is offset by the number of documents in the corpus that contain the word, which helps to adjust for the fact that some words appear more frequently in general.

Implementations of the invention are improvements to the functioning of a computer. For example, revising the vector of the first table in a database improves the accuracy of a computer when predicting associations between tables in the database. In addition, implementations of the invention include features that are not well understood, routine, or conventional activity in the relevant art. For example, revising the vector of the first table by: multiplying the count of a first keyword in the vector of a first custom attribute by a multiplier; multiplying the count of a second keyword in the vector of the first custom attribute by the multiplier; and establishing revised counts of the first and second keywords in the vector of the first table by adding the above products to the respective counts of the first and second keywords in the vector of the first table is not well-understood, routine, or conventional.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
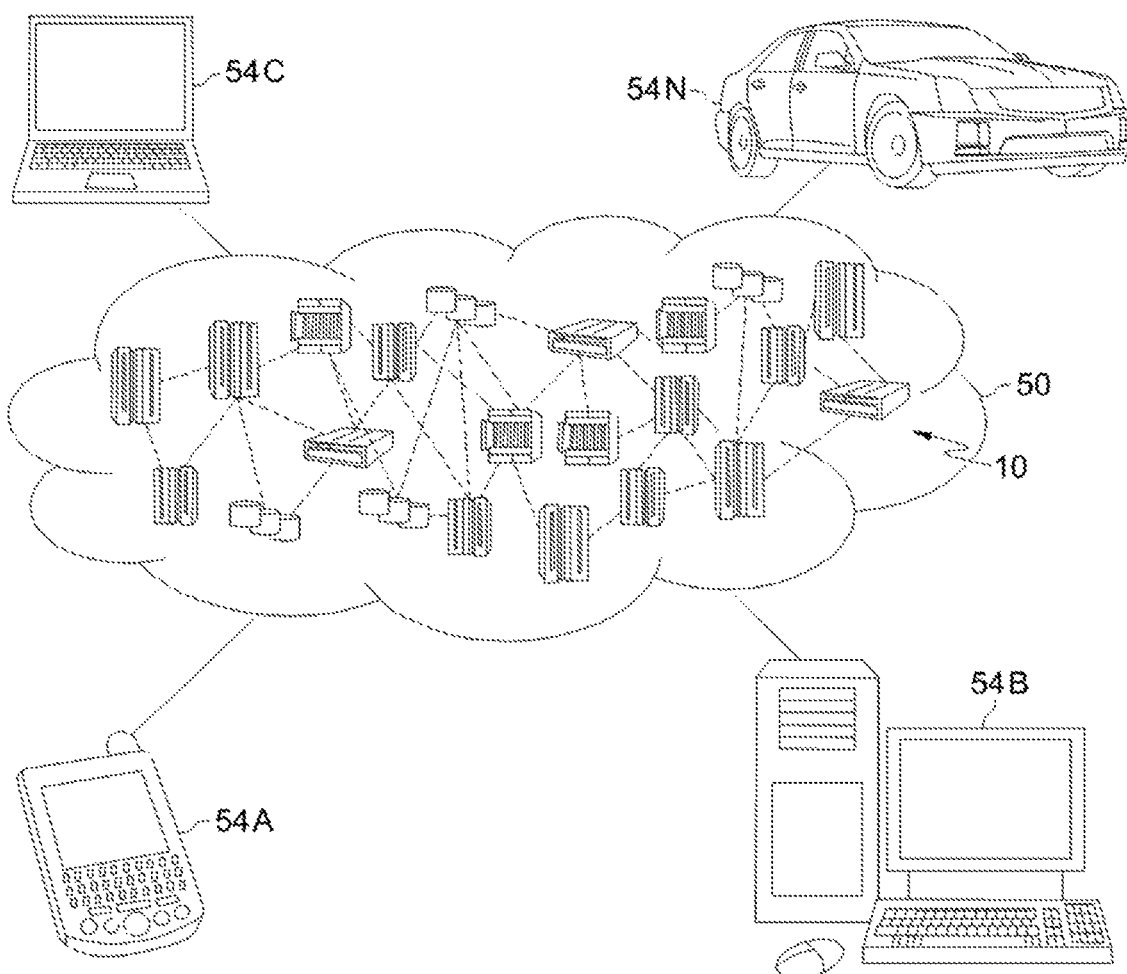
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
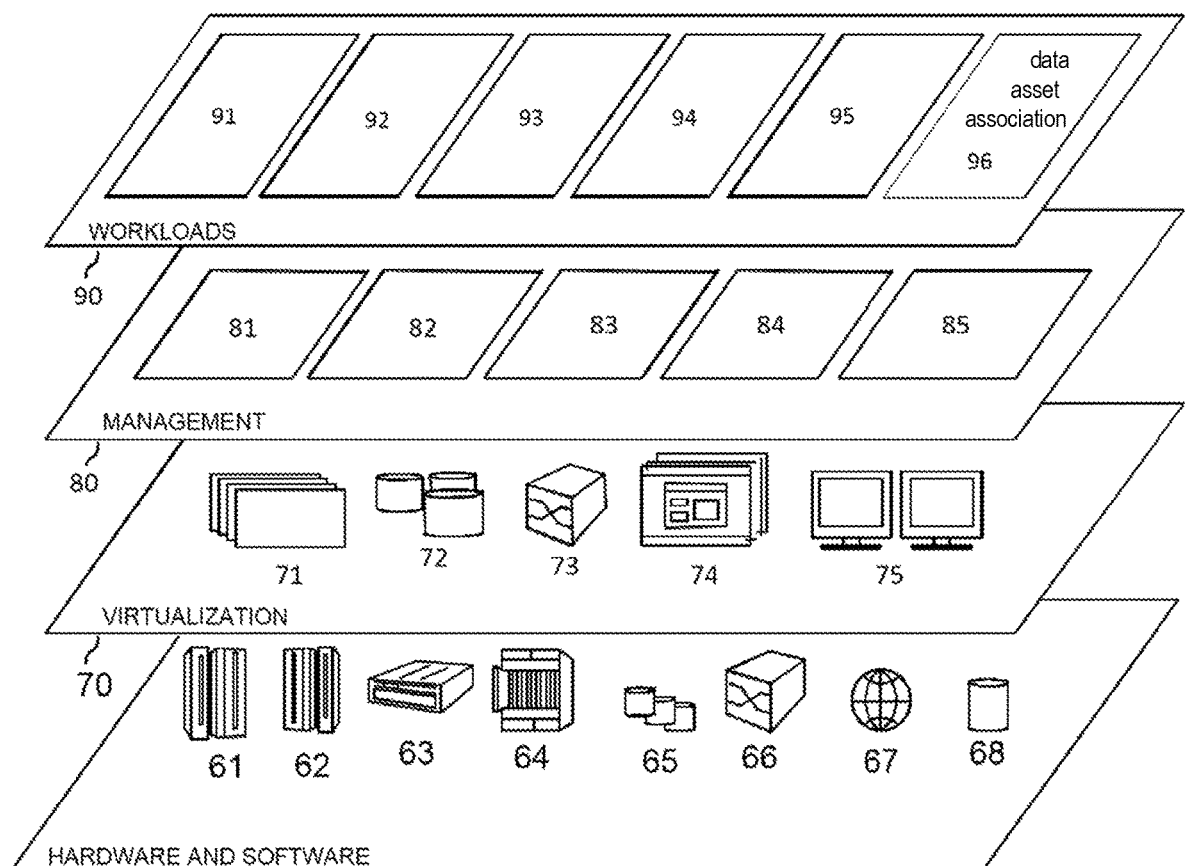
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data asset association 96.

Implementations of the invention may include a computer system/server 12 of FIG. 1 in which one or more of the program modules 42 are configured to perform (or cause the computer system/server 12 to perform) one of more functions of the data asset association 96 of FIG. 3. For example, the one or more of the program modules 42 may be configured to: read a vector of a first table in a database, the vector including counts of a plurality of keywords in the first table, the plurality of keywords including a first keyword and a second keyword; determine a first custom attribute describing the first table, the first custom attribute having a vector including counts of at least a first portion of the plurality of keywords in the first table; determine a multiplier of the first custom attribute, the multiplier being a number of other tables that reference the first custom attribute; and revise the vector of the first table by determining a first product by multiplying the count of the first keyword in the vector of the first custom attribute by the multiplier of the first custom attribute, determining a second product by multiplying the count of a second keyword in the vector of the first custom attribute by the multiplier of the first custom attribute, establishing a revised count of the first keyword in the vector of the first table by adding the first product to the count of the first keyword in the vector of the first table, and establishing a revised count of the second keyword in the vector of the first table by adding the second product to the count of the second keyword in the vector of the first table.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
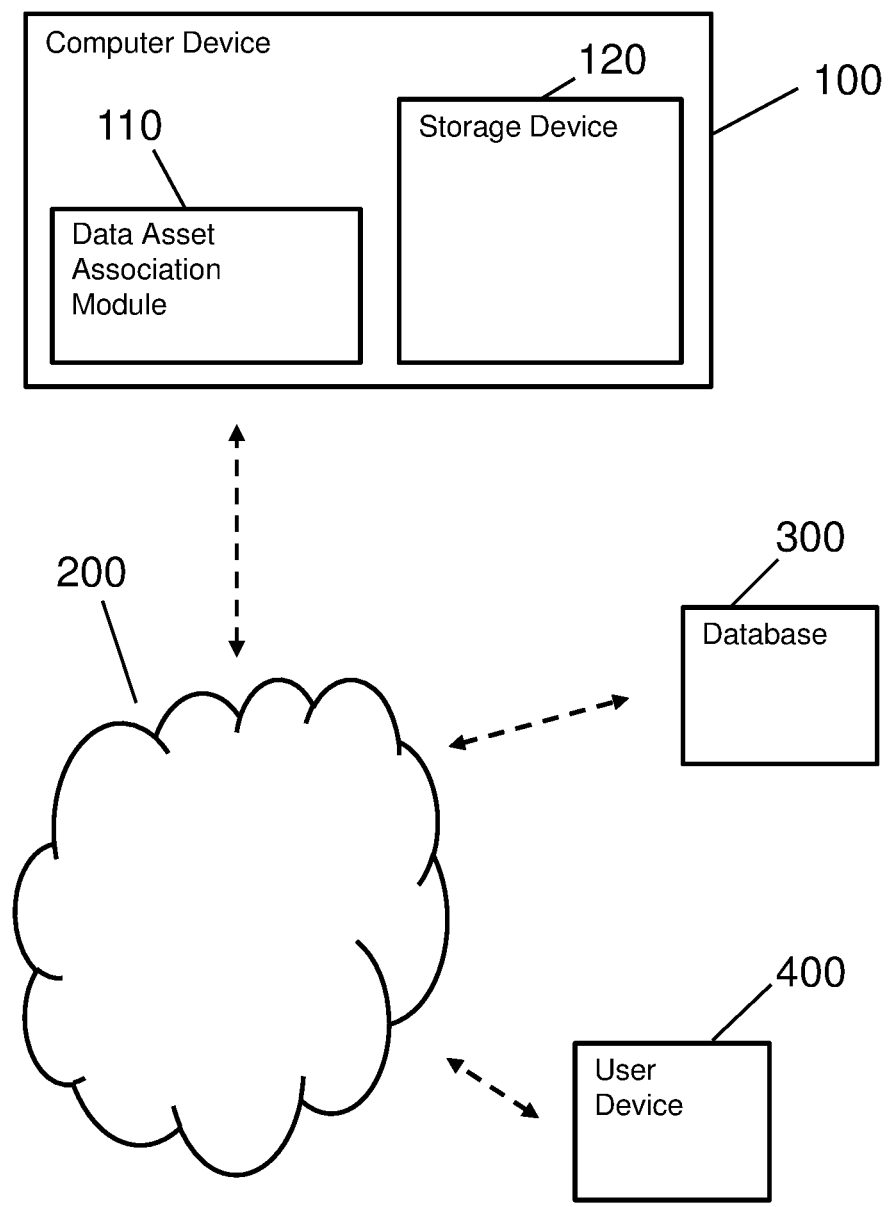
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example cloud computing environment 50. In this example, computer device 100 includes a data asset association module 110, for example, one or more of program modules 42 in FIG. 1, and a storage device 120 such as, for example, storage system 34 in FIG. 1.

FIG. 4 shows a database 300 such as, for example, external device 14 in FIG. 1, that includes assets (such as tables) that are accessed by data asset association module 110 (other examples include more than one database 300). In embodiments, one or more databases that are accessed by data asset association module 110 are stored on storage device 120.

FIG. 4 shows a user device 400 such as, for example, external device 14 in FIG. 1, that is used by a user to access data asset association module 110 in order to associate a term with tables in databases such as, for example, database 300.

Figure 5:
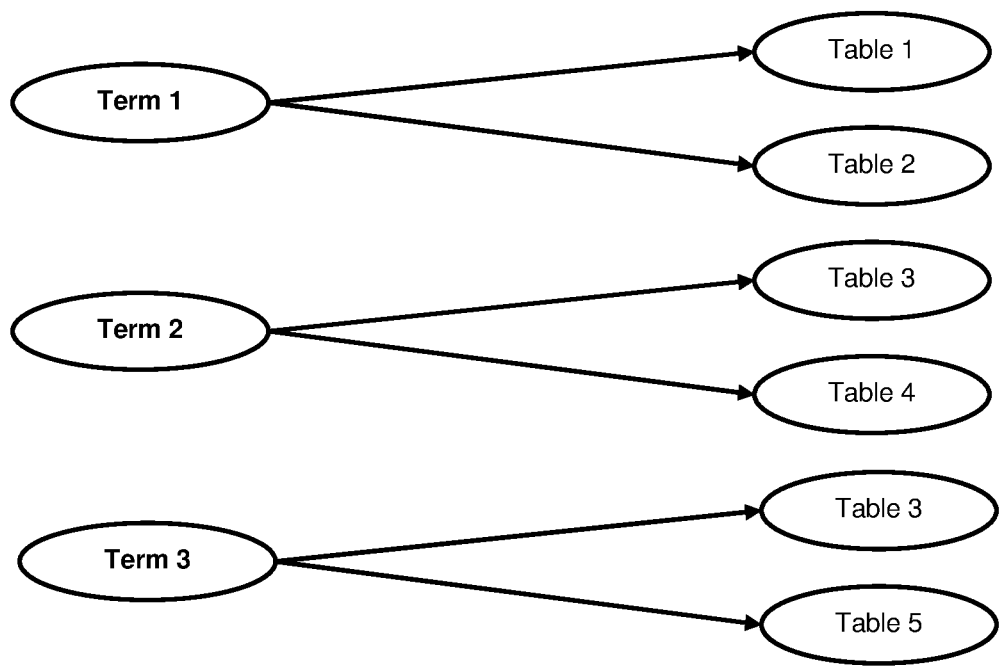
FIG. 5 shows a block diagram of an exemplary data association scenario in accordance with aspects of the invention.

FIG. 5 shows an example of terms associated with tables in a database, for example. In this example, Term 1 is associated with Table 1 and Table 2; Term 2 is associated with Table 3 and Table 4; and Term 3 is associated with Table 3 and Table 5. As shown in this example, a particular term can be associated with multiple tables, and a particular table can have multiple terms associated with it. In embodiments, a user, through, for example, user device 400, accesses data asset association module 110 to associate a new term with tables in database 300.

Figures 6, 7:
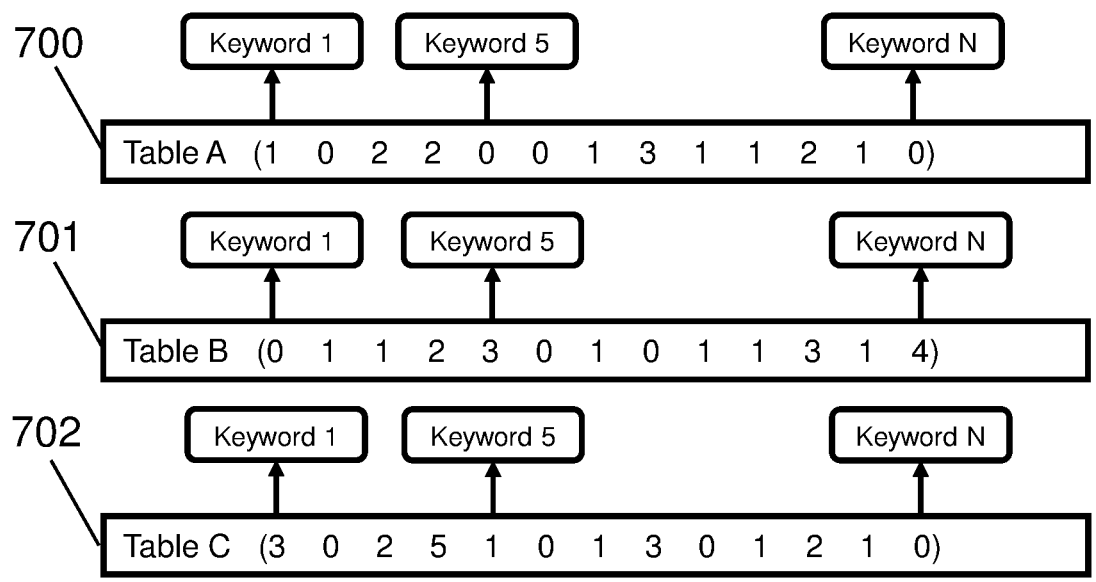
FIG. 6 shows a table of distances in accordance with aspects of the invention.
FIG. 7 shows a diagram of table vectors in accordance with aspects of the invention.

FIG. 6 shows a chart of "distances" between a plurality of tables. In FIG. 6, Table 2 is a distance of 8 away from Table 4. The distance between two tables is an indication of a level of similarity between the two tables. For example, because the distance between Tables 2 and 4 is 8 and the distance between Tables 2 and 5 is 1, Table 2 is considered to be more similar to Table 5 than it is to Table 4. In embodiments, the distance between two tables is represented by a difference between vectors of the two tables. In embodiments, each vector is a group of counts of keywords in the table.

FIG. 7 shows three examples of vectors in accordance with embodiments of the invention. In FIG. 7, the vector 700 for Table A shows that Keyword 1 occurs one time in Table A. Similarly, Keyword 5 and Keyword N do not occur in Table A. In this example, the vector 701 for Table B shows that Keyword 1 does not occur in Table B. Similarly, Keyword 5 occurs three times in Table B and Keyword N occurs four times in Table B. In this example, the vector 702 for Table C shows that Keyword 1 occurs three times in Table C. Similarly, Keyword 5 occurs one time in Table C and Keyword N does not occur in Table C. In embodiments, comparison of two vectors, for example the vectors for Table A and Table B, shows a similarity, or closeness of association, of the two tables. This closeness is referred to as the distance between the two tables.

In embodiments, data asset association module 110 finds and compares tables that are sufficiently similar to a subject table. The subject table is a table that is already associated with a term supplied by a user (subject term). In embodiments, the user wants to find other tables that are sufficiently similar to the subject table so that the data in the sufficiently similar other tables is associated with the subject term. In embodiments, data asset association module 110 processes the vectors of the other tables in a way that accurately determines which of the other tables are sufficiently similar to the subject table.

Figures 8, 9:
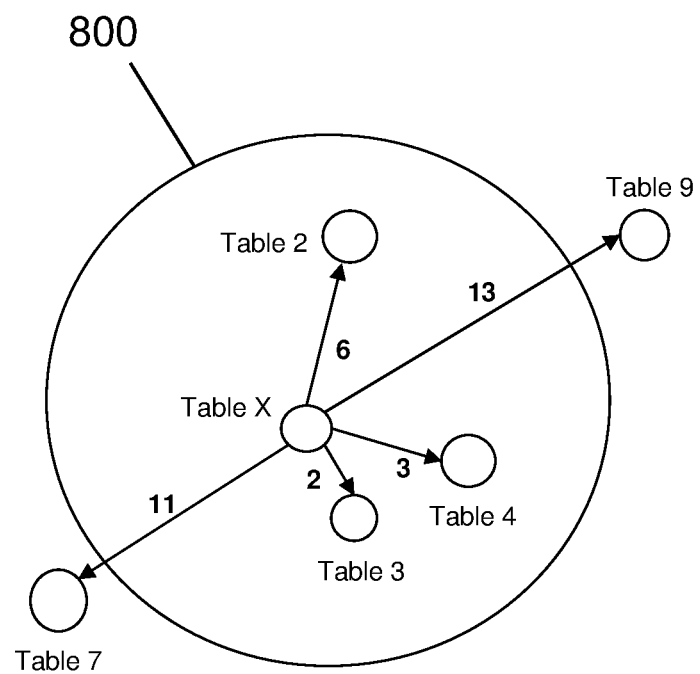
FIG. 8 shows a first diagram of distances between tables in accordance with aspects of the invention.
FIG. 9 shows a first table of terms and predictions in accordance with aspects of the invention.

FIG. 8 is a diagram showing the relative position (closeness) of a plurality of tables. In embodiments, data asset association module 110 only considers assets (in this case, tables) within a predetermined distance 800 of a subject table (Table X) when searching for tables that are sufficiently similar to the subject table. In this example, data asset association module 110 determines the positions of Tables X, 2, 3, 4, 7 and 9 using the simple keyword counts of the vectors, as shown in FIG. 7.

FIG. 9 is a chart that shows that, based on the positions of the Tables 2, 3, 4, 7 and 9, relative to Table X, only Tables 3 and 4 are sufficiently close to Table X to be considered sufficiently similar to Table X. In this example, data asset association module 110 designates only those tables with a distance of less than 6 from Table X as sufficiently close to Table X. In other embodiments, other distances are used. As a result, data asset association module 110 determines that only Tables 3 and 4 are associated with the subject term. As a result of data asset association module 110 determining that Tables 3 and 4 are associated with the subject term, all other terms of Tables 3 and 4 are associated with Table X (the subject table). FIG. 9 shows that Term 2 is now associated with Table X because Term 2 is in Table 3 (and Table 4), whereas Term 1 is not associated with Table X because Table 2 is not associated with the subject term.

Figure 10:
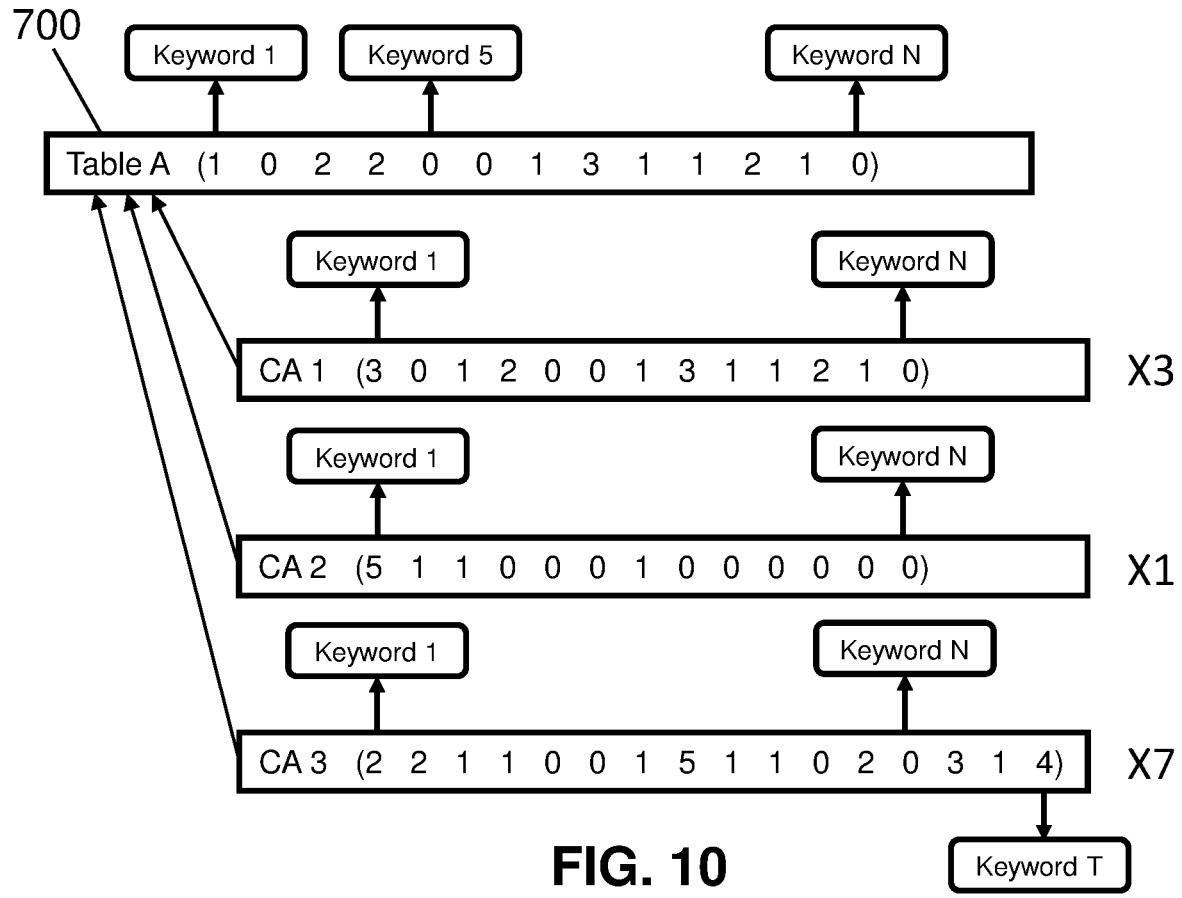
FIG. 10 shows a diagram of a table vector and custom attribute vectors in accordance with aspects of the invention.
Figure 11:
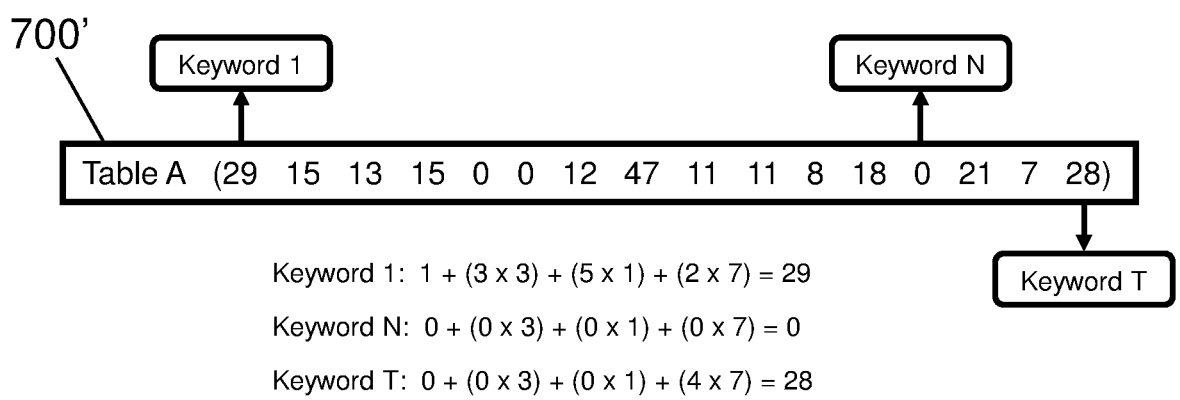
FIG. 11 shows a diagram of a revised table vector in accordance with aspects of the invention.
Figures 12, 13:
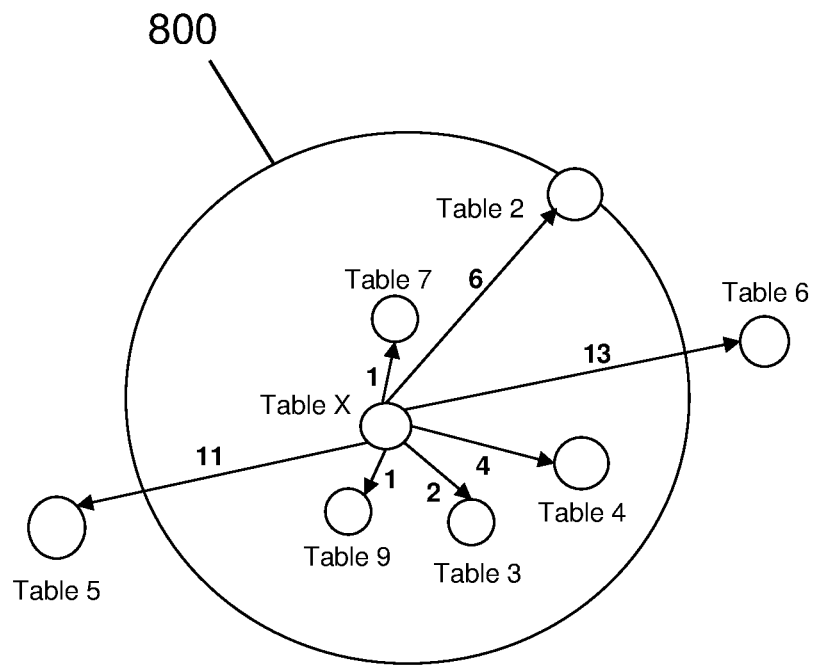
FIG. 12 shows a second diagram of distances between tables in accordance with aspects of the invention.
FIG. 13 shows a second table of terms and predictions in accordance with aspects of the invention.

FIGS. 10 and 11 show an embodiment of the invention in which data asset association module 110 revises the vector 700 of Table A to produce a more accurate location of Table A (as shown in FIG. 12). In this example, embodiments of the invention provide additional information to the keyword counts in each vector to improve the accuracy of the positions of the tables.

FIG. 10 shows the vector 700 of Table A before any additional information is added (as also shown in FIG. 7). In embodiments, data asset association module 110 defines a first custom attribute of Table A. A custom attribute is a property that describes an asset (table). Custom attributes (company size, year founded, for example) extend the meaning of an asset beyond what standard attributes (company name, address, for example) define. In this example, data asset association module 110 has defined three custom attributes (CA 1, CA 2, CA 3) of Table A. In other embodiments, a different number of custom attributes are defined. Data asset association module 110 combines the keyword counts of the three (in this example) custom attribute vectors with the keyword counts of the Table A vector 700 to produce a revised Table A vector 700' that will more accurately locate Table A on the diagram of FIG. 12. In embodiments, data asset association module 110 determines a multiplier for each custom attribute vector. In embodiments, the multiplier is equal to the number of other tables that reference that custom attribute. In this example, CA 1 is referenced by three other tables, CA 2 is referenced by one other table, and CA 3 is referenced by seven other tables. The multiplier provides added weight to custom attributes that are referenced by a greater number of other tables to represent a greater importance of those attributes to the position of the Table A vector.

FIG. 11 shows a revised Table A vector 700' and the calculations performed by data asset association module 110 to revise the Table A vector 700. For example, Keyword 1 has a revised count of 29 as a result of the counts of Keyword 1 in each of the vectors of CA 1, CA 2 and CA3 being multiplied by their respective multipliers, and then added to the Keyword 1 (1) count in the original Table A vector 700 shown in FIG. 10. Similarly, data asset association module 110 performs the calculations for all of the keywords in Table A, CA 1, CA 2 and CA 3. If a keyword exists in any of the custom attributes, data asset association module 110 adds the counts for those keywords to the revised Table A vector 700'. In this example, as shown in FIG. 10, CA 3 has three keywords that do not exist in the original Table A vector 700 (including Keyword T). FIG. 11 shows that data asset association module 110 adds these three new keywords to the revised Table A vector 700'.

FIG. 12 is similar to FIG. 8, except that data asset association module 110 uses revised vectors for the other tables within predetermined distance 800 to determine which tables it considers sufficiently close to Table X. In this example, Tables 2, 3, 4, 7 and 9 are located inside predetermined distance 800. Comparing FIG. 12 to FIG. 8 shows that data asset association module 110 considers different tables as being sufficiently close to Table X due to using the revised vectors (developed similarly to revised Table A vector 700'). Using the same distance constraint as in FIG. 8 (a distance of less than 6 from Table X as sufficiently close to Table X), FIG. 12 shows that only Tables 3, 4, 7 and 9 are sufficiently close to Table X.

Similar to FIG. 9, but for the revised vectors, FIG. 13 is a chart that shows that, based on the positions of the Tables 2, 3, 4, 7 and 9, relative to Table X, Tables 3, 4, 7 and 9 are now sufficiently close to Table X to be considered sufficiently similar to Table X. As in FIG. 8, in this example, data asset association module 110 designates only those tables with a distance of less than 6 from Table X as sufficiently close to Table X. In other embodiments, other distances are used. As a result, data asset association module 110 determines that Tables 3, 4, 7 and 9 are associated with the subject term. As a result of data asset association module 110 determining that Tables 3, 4, 7 and 9 are associated with the subject term, all other terms of Tables 3, 4, 7 and 9 are associated with Table X (the subject table). FIG. 13 shows that Terms 2 and 9 are now associated with Table X because Terms 2 and 9 are in at least one of Tables 3, 4, 7 and 9, whereas Term 1 is not associated with Table X because Table 2 is not associated with the subject term. In embodiments, data asset association module 110 determines that terms in Table A (Term 2 in Table 7, for example), as shown in FIG. 13, are associated with the subject term. In this manner, embodiments of the invention associate, or link, data in one or more other tables to the subject term. In an exemplary embodiment, data that resides in Table A (one of the other tables) and is related to a user ID, for example, is associated with that user ID (the subject term) because Table A is associated with Table X.

In embodiments, by revising the table vectors as discussed above, data asset association module 110 provides a more accurate representation (location) of tables in a database so that other tables are more accurately associated with a subject term. This, in turn, leads to other data in the database (the sufficiently close tables) being associated with the subject term.

Figure 14:
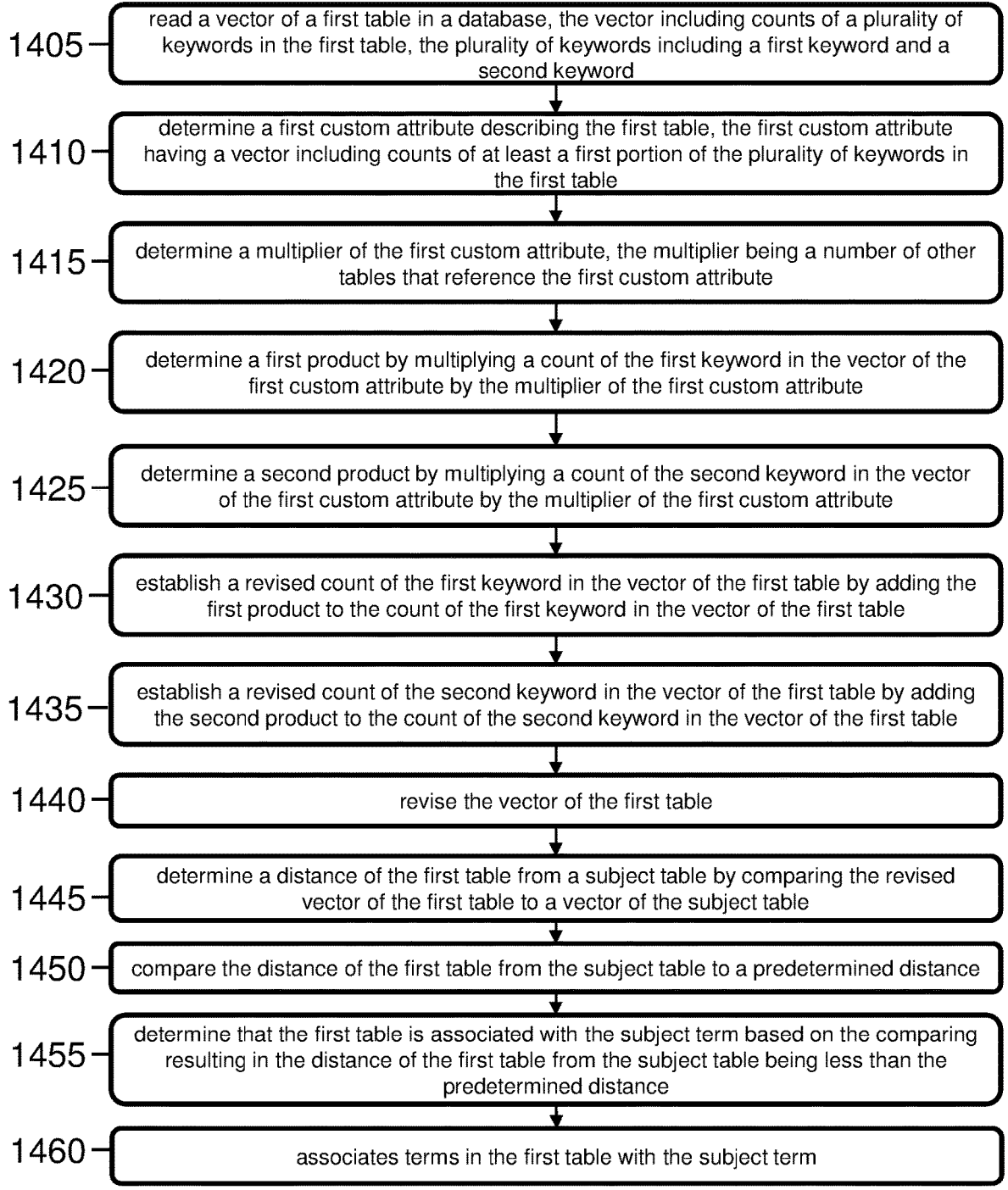
FIG. 14 shows a flowchart of an exemplary method in accordance with aspects of the invention.

FIG. 14 shows a flowchart of an exemplary method in accordance with aspects of the present invention. Steps of the method may be carried out in the environment of FIG. 4 and are described with reference to elements depicted in FIG. 4.

At step 1405, the system reads a vector of a first table in a database, the vector including counts of a plurality of keywords in the first table, the plurality of keywords including a first keyword and a second keyword. In embodiments, and as described with respect to FIG. 7, data asset association module 110 reads vector 700 of Table A in database 300, vector 700 including counts of a plurality of keywords in Table A, the plurality of keywords including Keyword 1 and Keyword N.

At step 1410, the system defines a first custom attribute describing the first table, the first custom attribute having a vector including counts of at least a first portion of the plurality of keywords in the first table. In embodiments, and as described with respect to FIG. 10, data asset association module 110 defines CA 1 describing the Table A, CA 1 having a vector including counts of at least a first portion of the plurality of keywords in Table A.

At step 1415, the system determines a multiplier of the first custom attribute, the multiplier being a number of other tables that reference the first custom attribute. In embodiments, and as described with respect to FIG. 10, data asset association module 110 determines a multiplier (3) of CA 1, the multiplier being a number of other tables (for example, in database 300) that reference CA 1.

At step 1420, the system determines a first product by multiplying the count of the first keyword in the vector of the first custom attribute by the multiplier of the first custom attribute. In embodiments, and as described with respect to FIG. 11, data asset association module 110 determines a first product (9) by multiplying the count of Keyword 1 (3) in the vector of CA 1 by the multiplier (3) of CA 1 (shown in FIG. 11).

At step 1425, the system determines a second product by multiplying the count of a second keyword in the vector of the first custom attribute by the multiplier of the first custom attribute. In embodiments, and as described with respect to FIG. 11, data asset association module 110 determines a second product (0) by multiplying the count of Keyword N (0) in the vector of the CA 1 by the multiplier (3) of the CA 1 (shown in FIG. 11).

At step 1430, the system establishes a revised count of the first keyword in the vector of the first table by adding the first product to the count of the first keyword in the vector of the first table. In embodiments, and as described with respect to FIG. 11, data asset association module 110 establishes a revised count of Keyword 1 in the vector 700 of Table A by adding the first product (9) to the count (1) of Keyword 1 in the vector 700 of Table A.

At step 1435, the system establishes a revised count of the second keyword in the vector of the first table by adding the second product to the count of the second keyword in the vector of the first table. In embodiments, and as described with respect to FIG. 11, data asset association module 110 establishes a revised count of Keyword N in the vector 700 of Table A by adding the second product (0) to the count (0) of Keyword N in the vector 700 of Table A. In embodiments, this process includes multiple custom attributes (CA 1, CA 2, CA3, for example) and is repeated for all keywords in the vector of Table A.

At step 1440, the system revises the vector of the first table (to produce a revised vector of the first table). In embodiments, and as described with respect to FIG. 11, data asset association module 110 revises the vector 700 of Table A with the information from steps 1430 and 1435 to produce revised vector 700' of Table A.

At step 1445, the system determines a distance of the first table from a subject table by comparing the revised vector of the first table to a vector of the subject table. In embodiments, and as described with respect to FIG. 12, data asset association module 110 determines a distance of Table A from Table X by comparing the revised vector of Table A to a vector of Table X.

At step 1450, the system compares the distance of the first table from the subject table to a predetermined distance. In embodiments, and as described with respect to FIG. 12, data asset association module 110 compares the distance of Table A (Table 7 in FIG. 12, for example) from Table X to a predetermined distance of 6.

At step 1455, the system determines that the first table is associated with the subject term based on the comparing resulting in the distance of the first table from the subject table being less than the predetermined distance. In embodiments, and as described with respect to FIGS. 12 and 13, data asset association module 110 determines that Table A (Table 7, for example) is associated with the subject term based on the comparing resulting in the distance (1) of Table 7 from Table X being less than the predetermined distance of 6.

At step 1460, the system associates terms in the first table with the subject term. In embodiments, data asset association module 110 determines that terms in Table A (Term 2 in Table 7, for example) as shown in FIG. 13 are associated with the subject term. In this manner, embodiments of the invention associate, or link, data in one or more other tables to the subject term. In an exemplary embodiment, data that resides in Table A (one of the other tables) and is related to a user ID, for example, is associated with that user ID (the subject term) because Table A is associated with Table X.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   reading, by a computer device, a vector of a first table in a database, the vector including counts of a plurality of keywords in the first table, the plurality of keywords including a first keyword and a second keyword;
   defining, by the computer device, a first custom attribute describing the first table, the first custom attribute having a vector including counts of at least a first portion of the plurality of keywords in the first table;
   determining, by the computer device, a multiplier of the first custom attribute, the multiplier being a number of other tables that reference the first custom attribute; and
   revising, by the computer device, the vector of the first table by:
      determining a first product by multiplying a count of the first keyword in the vector of the first custom attribute by the multiplier of the first custom attribute,
      determining a second product by multiplying a count of the second keyword in the vector of the first custom attribute by the multiplier of the first custom attribute,
      establishing a revised count of the first keyword in the vector of the first table by adding the first product to the count of the first keyword in the vector of the first table, and
      establishing a revised count of the second keyword in the vector of the first table by adding the second product to the count of the second keyword in the vector of the first table;
   determining, by the computer device, a distance of the first table from a subject table by comparing the revised vector of the first table to a vector of the subject table;
   comparing, by the computer device, the distance of the first table from the subject table to distances of the other tables to the subject table using a K-Nearest Neighbor algorithm, wherein the distance between tables is an indication of a level of similarity of association between the first table and the subject table, and the subject table is a table that is already associated with a term supplied by a user; and
   associating, by the computer device, terms in the first table with the term in the subject table by linking the terms in the first table with the term in the subject table based on the determined distance.

2. The computer-implemented method of claim 1, further comprising:
   determining, by the computer device, a second custom attribute describing the first table, the second custom attribute having a vector including counts of at least a second portion of the plurality of keywords in the first table;
   determining, by the computer device, a multiplier of the second custom attribute, the multiplier being a number of other tables that reference the second custom attribute; and
   further revising, by the computer device, the vector of the first table by
      determining a third product by multiplying a count of the first keyword in the vector of the second custom attribute by the multiplier of the second custom attribute,
      determining a fourth product by multiplying a count of the second keyword in the vector of the second custom attribute by the multiplier of the second custom attribute,
      adding the third product to the revised count of the first keyword, and
      adding the fourth product to the revised count of the second keyword.

3. The computer-implemented method of claim 2, further comprising determining, by the computer device, the distance of the first table from the subject table by comparing the further revised vector of the first table to the vector of the subject table.

4. The computer-implemented method of claim 2, further comprising adding to the first table keywords in the first custom attribute that are absent from the first table.

5. The computer-implemented method of claim 1, wherein the associating is based on the distance of the first table from the subject table being less than distances of other tables to the subject table.

6. The computer-implemented method of claim 1, wherein the comparing comprises applying the K-Nearest Neighbor algorithm to the first table and at least one other table of the other tables.

7. The computer-implemented method of claim 1, wherein the computer device includes software provided as a service in a cloud computing environment.

8. A computer program product, the computer program product comprising one or more computer readable storage media having program instructions collectively stored on the one or more computer readable storage media, the program instructions executable to:
read a vector of a first table in a database, the vector including counts of a plurality of keywords in the first table, the plurality of keywords including a first keyword and a second keyword;
define a first custom attribute describing the first table, the first custom attribute having a vector including counts of at least a first portion of the plurality of keywords in the first table;
determine a multiplier of the first custom attribute, the multiplier being a number of other tables that reference the first custom attribute; and
revise the vector of the first table by
determining a first product by multiplying a count of the first keyword in the vector of the first custom attribute by the multiplier of the first custom attribute,
determining a second product by multiplying a count of the second keyword in the vector of the first custom attribute by the multiplier of the first custom attribute,
establishing a revised count of the first keyword in the vector of the first table by adding the first product to the count of the first keyword in the vector of the first table, and
establishing a revised count of the second keyword in the vector of the first table by adding the second product to the count of the second keyword in the vector of the first table;
determine a distance of the first table from a subject table by comparing the revised vector of the first table to a vector of the subject table;
compare the distance of the first table from the subject table to distances of the other tables to the subject table using a K-Nearest Neighbor algorithm; and
associate terms in the first table with a term in the subject table by linking the terms in the first table with the term in the subject table based on the determined distance.

9. The computer program product of claim 8, wherein the program instructions are further executable to compare the distance of the first table from the subject table to a predetermined distance.

10. The computer program product of claim 9, wherein the program instructions are further executable to determine that the first table is associated with a subject term of the subject table based on the comparing resulting in the distance of the first table from the subject table being less than the predetermined distance.

11. The computer program product of claim 8, wherein the comparing comprises applying the K-Nearest Neighbor algorithm to the first table and at least one other table of the other tables.

12. The computer program product of claim 8, wherein the program instructions are further executable to add to the first table keywords in the first custom attribute that are absent from the first table.

13. The computer program product of claim 8, wherein the program instructions are further executable to:
determine a second custom attribute describing the first table, the second custom attribute having a vector including counts of at least a second portion of the plurality of keywords in the first table;
determine a multiplier of the second custom attribute, the multiplier being a number of other tables that reference the second custom attribute; and
further revise the vector of the first table by
determining a third product by multiplying a count of the first keyword in the vector of the second custom attribute by the multiplier of the second custom attribute,
determining a fourth product by multiplying a count of the second keyword in the vector of the second custom attribute by the multiplier of the second custom attribute,
adding the third product to the revised count of the first keyword, and
adding the fourth product to the revised count of the second keyword.

14. The computer program product of claim 13, wherein the program instructions are further executable to determine the distance of the first table from the subject table based on the comparing the further revised vector of the first table to the vector of the subject table.

15. A system comprising:
a processor, a computer readable memory, and one or more computer readable storage media;
program instructions to read a vector of a first table in a database, the vector including counts of a plurality of keywords in the first table, the plurality of keywords including a first keyword and a second keyword;
program instructions to define a first custom attribute describing the first table, the first custom attribute having a vector including counts of at least a first portion of the plurality of keywords in the first table;
program instructions to determine a multiplier of the first custom attribute, the multiplier being a number of other tables that reference the first custom attribute; and
program instructions to revise the vector of the first table by
determining a first product by multiplying a count of the first keyword in the vector of the first custom attribute by the multiplier of the first custom attribute,
determining a second product by multiplying a count of the second keyword in the vector of the first custom attribute by the multiplier of the first custom attribute,
establishing a revised count of the first keyword in the vector of the first table by adding the first product to the count of the first keyword in the vector of the first table, and establishing a revised count of the second keyword in the vector of the first table by adding the second product to the count of the second keyword in the vector of the first table;

program instructions to determine a distance of the first table from a subject table by comparing the revised vector of the first table to a vector of the subject table;

program instructions to compare the distance of the first table from the subject table to distances of the other tables to the subject table using a K-Nearest Neighbor algorithm; and program instructions to associate terms in the first table with a term in the subject table by linking the terms in the first table with the term in the subject table based on the determined distance, wherein the program instructions are collectively stored on the one or more computer readable storage media for execution by the processor via the computer readable memory.

16. The system of claim 15, further comprising:

program instructions to determine a second custom attribute describing the first table, the second custom attribute having a vector including counts of at least a second portion of the plurality of keywords in the first table;

program instructions to determine a multiplier of the second custom attribute, the multiplier being a number of other tables that reference the second custom attribute; and program instructions to further revise the vector of the first table by
determining a third product by multiplying a count of the first keyword in the vector of the second custom attribute by the multiplier of the second custom attribute,
determining a fourth product by multiplying a count of the second keyword in the vector of the second custom attribute by the multiplier of the second custom attribute,
adding the third product to the revised count of the first keyword, and
adding the fourth product to the revised count of the second keyword.

17. The system of claim 16, further comprising program instructions to determine the revised distance of the first table from the subject table by comparing the further revised vector of the first table to the vector of the subject table.

18. The system of claim 15, further comprising program instructions to compare the distance of the first table from the subject table to a predetermined distance.

19. The system of claim 15, wherein the distance between tables is an indication of a level of similarity of association between the first table and the subject table, and the subject table is a table that is already associated with the term supplied by a user.

* * * * *